United States Patent [19]

Voigtläender

[11] Patent Number: 4,476,991

[45] Date of Patent: Oct. 16, 1984

[54] PRESSURIZABLE CONTAINER HAVING A SAFETY DEVICE FOR RELEASING EXCESSIVE CONTAINER PRESSURE

[75] Inventor: Kurt Voigtläender, Offenbach am Main, Fed. Rep. of Germany

[73] Assignee: Siemens Aktiengesellschaft, Berlin and Munich, Fed. Rep. of Germany

[21] Appl. No.: 588,019

[22] Filed: Mar. 9, 1984

[30] Foreign Application Priority Data

Mar. 24, 1983 [DE] Fed. Rep. of Germany ....... 3310782

[51] Int. Cl.$^3$ ............................................. F16K 17/16
[52] U.S. Cl. ................................ 220/89 A; 137/68 R; 137/70; 137/71
[58] Field of Search .................... 220/89 A, 89 R, 3; 137/68 R, 70, 71

[56] References Cited

U.S. PATENT DOCUMENTS

| 1,970,718 | 8/1934 | Tryon et al. | 220/89 |
|---|---|---|---|
| 2,079,164 | 5/1937 | Glab | 137/53 |
| 2,954,897 | 10/1960 | Hansen et al. | 220/89 A |
| 3,279,647 | 10/1966 | van Dop | 220/89 |
| 4,022,236 | 5/1977 | Dumout et al. | 220/89 A X |
| 4,119,112 | 10/1978 | Adler | 220/89 A X |
| 4,119,236 | 10/1978 | Shaw et al. | 220/89 A |
| 4,301,938 | 11/1981 | Wood et al. | 220/89 A |
| 4,345,611 | 8/1982 | Ikeda et al. | 220/89 A X |
| 4,363,418 | 12/1982 | Matz | 220/89 A |
| 4,394,926 | 7/1983 | Ou et al. | 220/89 A |
| 4,434,905 | 3/1984 | Ou et al. | 220/89 A |

FOREIGN PATENT DOCUMENTS

| 568051 | 12/1932 | Fed. Rep. of Germany . |
|---|---|---|
| 1790137 | 9/1971 | Fed. Rep. of Germany . |
| 2540597 | 5/1976 | Fed. Rep. of Germany . |
| 2727935 | 12/1977 | Fed. Rep. of Germany . |
| 2828341 | 3/1979 | Fed. Rep. of Germany . |
| 2706723 | 12/1982 | Fed. Rep. of Germany . |
| 1595660 | 7/1970 | France . |
| 2044512 | 2/1971 | France . |
| 2252519 | 6/1975 | France . |
| 2355226 | 1/1978 | France . |

*Primary Examiner*—Steven M. Pollard
*Attorney, Agent, or Firm*—Karl F. Milde, Jr.; Andrew G. Rodau

[57] ABSTRACT

There is disclosed a safety device for releasing excessive pressure in a pressurizable container having a pressure release outlet, rupturable closure element in the form of a membrane which hermetically seals the outlet, a cutting device arranged to rupture the closure element when a predetermined maximum pressure in the container is exceeded, a rigid retaining device which holds the cutting device in a position out of engagement with the closure element when the container pressure is less than the predetermined maximum pressure, and a predetermined weakening provided on the retaining device which breaks when the predetermined maximum pressure is exceeded so as to allow the cutting device to move under the action of the pressure in the container so as to rupture the closure element. The retaining device is rigidly connected to the cutting device, and the latter is rigidly connected to a first plate. The closure element is clamped between the first plate and a second plate in such a way that a rupturable rim is defined to be engaged by a cutting edge of the cutting device. The retaining device, the cutting device and the first plate are arranged on the side of the closure element which faces the interior of the container. The safety device is therefore able to react suddenly to cause rapid movement of the cutting device when the maximum pressure is exceeded. The closure element is passive, so the choice of material is therefore greater, and the general shape of the closure element is not limited to a circle.

11 Claims, 1 Drawing Figure

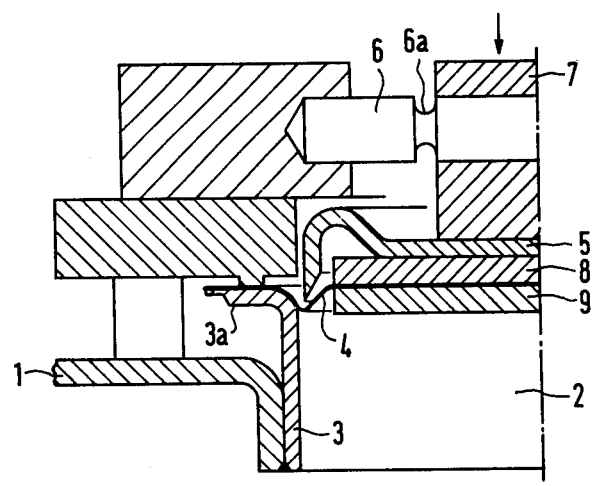

PRESSURIZABLE CONTAINER HAVING A SAFETY DEVICE FOR RELEASING EXCESSIVE CONTAINER PRESSURE

BACKGROUND OF THE INVENTION

This invention relates to a pressurisable container having a safety device for releasing excessive container pressure. In particular, the invention relates to the general type of pressurisable container having a pressure release outlet, a rupturable closure element closing the outlet, a cutting device arranged to rupture the closure element when a predetermined maximum pressure in the container is exceeded, a rigid retaining device which holds the cutting member in a position out of engagement with the closure element when the container pressure is less than the predetermined maximum pressure, and a predetermined weakening provided on the retaining device which breaks when the predetermined maximum pressure is exceeded so as to allow the cutting device to move under the action of the pressure in the container to rupture the closure element.

Many types of safety devices against excessive pressure in a container are known. In addition to valves there are devices which have thin areas which break open in the event of excessive pressure, devices which are fitted with plane or concave-convex rupture discs, devices which have shearing plugs, or devices which contain closing elements which can be destroyed by explosive force.

According to respective requirements, safety devices are also frequently used which are each provided with a concave-convex, membrane-like closing element, which is placed against a cutting device in the event of excessive pressure and is cut open by this. However, these devices only operate satisfactorily when the rise in pressure acting on the closing element is relatively fast. If the pressure increases gradually, the minimum cutting action required to cut through the closing element is not always achieved. Existing safety devices with which the closing elements are pushed, changing their shape, against a cutting device by the prevailing pressure in the container, must be manufactured with extreme precision and require, as well as a sufficiently fast rise in pressure, the closing element to have a particular geometry and particular material properties if they are to operate satisfactorily (see German Pat. Nos. DE-A 2 828 341, 2 706 723, 2 540 597).

A safety device against excessive pressure in a container (of the general type referred to above) is known. In the case of one embodiment of this known safety device, which is constructed in the manner of a valve, the internal pressure of the container acts on one side of the closing element. A valve disc is adjacent to the opposite side of the closing element, and this disc is under spring pressure and has cutting points for cutting the closing element. According to a second embodiment, the spring can be omitted in the case of the known safety device, and the valve disc can have the form of a plunger, whose free shaft end engages with a cross bar wich is in turn gripped at both ends and has a desired pressure point on its rear side. Under the condition that the plunger, according to the second embodiment, is provided with cutting points according to the first embodiment, the known safety device operates in such a way that the closing element moves against the cutting points in the event of excessive pressure in the container, is cut open by them and breaks the cross bar at the point provided therefor, so that the plunger exposes the whole valve cross-section for a release of pressure. Here too, however, a relatively fast rise in pressure in the container is required if the cutting points are to be effective. If the pressure rises gradually, the closing element moves against the cutting points without being cut. The arrangement is such that only a round, outwardly deflectable closing element can be used (see U.S. Pat. No. 2,079,164).

In another safety device against excessive pressure in a container, a closing element is provided in which, if excessive pressure occurs, this closing element can be cut open by a tubular cutting device which is retained in the initial position by a lever and is held under spring pressure. The lever can pivot out of its initial position to release the cutting device by means of an expensive manostat device. The arrangement is sluggish however (see French Pat. No. 2 044 512).

Another safety device against excessive pressure contains a closing element that can be cut open with a tilting blade. In the event of excessive pressure, the tilting blade can be swivelled into the tilting position with an actuating rod which engages with a membrane arranged in its rear under the pressure prevailing in the container. This safety device is also very expensive, and the cutting device is retained in the initial position only by virtue of a force-fit (see U.S. Pat. No. 3,279,647).

Another safety device against excessive pressure in a container operates in such a way that an annular, two-position catch spring holds a hollow-cylindrical blade in one catch position against the pressure of a medium acting on a membrane designed as a closing element. If the pressure exceeds the strength of the catch spring, the membrane bulges outwards and moves the catch spring into its other catch position by means of intermediary members. The catch spring then jolts the blade against the membrane, and the latter is destroyed and the desired release of pressure results (see U.S. Pat. No. 3,482,732).

Safety devices similar to the art described above are known from the following: French Pat. Nos. 2 252 519; 1 595 660; 2 355 226; German Pat. No. 568 051; published German patent applications 2 727 935; 1 790 137; and U.S. Pat. Nos. 1,970,718; 3,145,573. The arrangement described in these patents and published patent applications are less similar to the general type of container with which the invention is concerned, than the above described safety devices.

SUMMARY OF THE INVENTION

The object of the present invention is to provide a safety device against excessive pressure in a container of the general type referred to above, that: (1) satisfactorily fulfills its safety function even when the presure acting on the closure element rises slowly; (2) has a simple structure; (3) can utilize a closure element of geometry; and (4) utilizes a closure element that remains premanently inactive, apart from its closing function, so that no particular demands must be made on its material properties, apart from mechanical strength and resistance to corrosion.

In a container according to the invention, when the pressure limit is reached, a cutting device becomes active suddenly with the desired results (and not gradually as in existing devices).

In general, the invention features a pressurisable container having a pressure release outlet, a rupturable closure element closing said outlet, a cutting device arranged to rupture the closure element when a predetermined maximum pressure in the container is exceeded, a rigid retaining device which holds the cutting device in a position out of engagement with the closure element when the container pressure is less than the predetermined maximum pressure, and a predetermined weakening provided on the retaining device which breaks when the predetermined maximum pressure is exceeded so as to allow the cutting device to move under the action of the pressure in the container so as to rupture the closure element, in which;

(a) the retaining device is rigidly connected to the cutting device;
(b) the cutting device is rigidly connected to a first plate; and
(c) the closure element is clamplped between the first plate and a second plate to define a rupturable rim of the closure element to be engaged by a cutting edge of the cutting device;

wherein the retaining device, the cutting device and the first plate are arranged on the side of the closure element which faces the interior of the container.

In preferred embodiments the retaining device is connected to the cutting device by an intermediate member which is exposed in use with the action of a pressure medium in the container which applies a force thereto in the direction towards the closure element; the retaining device comprises a retaining member rigidly clamped at one end in the intermediate member and at an opposite end in a fixing block arranged adjacent the release outlet mouth; a plurality of retaining members each clamped at one end in the intermediate member and at the opposite end in a block surrounding the release outlet mouth; the retaining member includes a retaining rod having a favourably discriminating transverse shear region; each of the plurality of retaining members comprises a retaining rod having a favourably discriminating transverse shear region; the favourably discriminating transverse shear region is formed by an annular groove in the surface of the retaining rod; and the closure element includes a metal foil element fixed at its outer periphery to the release outlet mouth.

Other features and advantages of the present invention will become apparent from the following detailed description, and from the claims.

For a full understanding of the present invention, reference should now be made to the following detailed description and to the accompanying drawing.

BRIEF DESCRIPTION OF THE DRAWING

The single FIGURE shows, in section, an outline of a safety device for releasing inadmissible pressure in a pressurisable container, in which all the essential components are connected to each other by force fitting them together.

DETAILED DESCRIPTION

The pressurisable container (not shown in detail) has container wall 1, in which a pressure release outlet or aperture 2 is provided.

Frame 3 is welded in a gas type manner into the pressure release aperture 2, and frame 3 has an outwardly deflected rim 3a. Closing element 4 (preferably circular) includes metal foil which is welded in a gas tight manner to rim 3a. Element 4 closes the mouth of pressure release aperture 2.

A cutting device consisting of a single blade is denoted with 5. Closing element 4 can be ruptured or cut with this blade when a predetermined maximum pressure limit is reached, in order to achieve a balance of pressure on both sides of closing element 4.

Cutting device 5 is retained in an initial position by a retaining device in the form of a retaining member of rod 6 clamped in a fixed position. Several retaining members 6 can also be used in place of only one retaining member 6 (not shown).

Retaining member 6 is connected by a force-fit to cutting device 5 via an intermediate member 7, which in turn is connected to closing element 4 by means of a first plate 8. However, closing element 4 is clamped between first plate 8 and second plate 9.

The single retaining member 6 or each of a plurality of retaining members 6 is clamped at one end in a block fixed internally to the container and adjacent to the mouth of pressure release outlet 2.

Plates 8 and 9 extend only far enough for there to be sufficient space between them and frame 3 to define a rupturable rim to be engaged by the cutting edge of cutting device 5.

Retaining member 6 is also provided with a desired break point 6a consisting, in the example shown, of an annular groove which breaks when the predetermined limit of the pressure acting on the whole arrangement is reached.

The operation of the device will now be described in detail. The whole arrangement is at rest when the container pressure is below the given pressure limit. As soon as the predetermined pressure limit is reached, retaining member 6 suddenly breaks at the desired break point 6a. The pressure acting in the direction of the arrow of the exposed surface of intermediate member 7 causes cutting device 5 to be moved suddenly against closing element 4, which is cut through by the application of the cutting device. The pressure medium then flows out of the pressure release aperture 2 until a balance of pressure is established in front of and behind closing element 4.

As illustrated, retaining device 6 has a predetermined weakening provided by a favourably discriminating transverse shear region, namely the annular groove at break point 6a. However, if desired, other means may provide the necessary predetermined weakening.

It will be noted that retaining device 6 is rigidly connected to cutting device 5 via intermediate member 7. Further, cutting device 5 is rigidly connected to a first plate 8, whereas the closure element 4 is clamped between first plate 8 and second plate 9. The clamping of the closure element 4 is such that a rupturable rim is defined in the path of sudden movement of the cutting edge of cutting device 5 when retaining device 6 is sheared and frees cutting device 5 for rapid movement. Retaining device 6, intermediate member 7, cutting device 5 and first plate 8 are all arranged on the side of closure element 4 which faces the interior of the container.

There has thus been shown and described a novel pressurisable container having a safety device for releasing excessive container pressure which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A pressurisable container having a pressure release outlet, a rupturable closure element closing said outlet, a cutting device arranged to rupture the closure element when a predetermined maximum pressure in the container is exceeded, a rigid retaining device which holds the cutting device in a position out of engagement with the closure element when the container pressure is less than the predetermined maximum pressure, and a predetermined weakening provided on the retaining device which breaks when the predetermined maximum pressure is exceeded so as to allow the cutting device to move under the action of the pressure in the container so as to rupture the closure element, comprising:

(a) the retaining device rigidly connected to the cutting device;
(b) the cutting device rigidly connected to a first plate; and
(c) the closure element clamped between the first plate and a second plate to define a rupturable rim of the closure element to be engaged by a cutting edge of the cutting device, wherein the retaining device, the cutting device and the first plate are arranged on the side of the closure element which faces the interior of the container.

2. The container according to claim 1, wherein the retaining device is connected to the cutting device by an intermediate member which is exposed in use to the action of a pressure medium in the container which applies a force thereof in a direction towards the closure element.

3. The container according to claim 2, wherein the retaining member comprises a retaining rod having a favourably discriminating transverse shear region.

4. The container according to claim 3, in which said favourably discriminating transverse shear region is formed by an annular groove in the surface of the retaining rod.

5. The container according to claim 2, wherein the retaining device comprises a retaining member rigidly clamped at one end in the intermediate member and at an opposite end in a fixing block arranged adjacent the release outlet mouth.

6. The container according to claim 5, further comprising a plurality of retaining members each clamped at one end in the intermediate member and at the opposite end in a block surrounding the release outlet mouth.

7. The container according to claim 6, wherein each retaining member comprises a retaining rod having a favourably discriminating transverse shear region.

8. The container according to claim 7, in which said favourably discriminating transverse shear region is formed by an annular groove in the surface of the retaining rod.

9. The container according to claim 5, wherein the retaining member comprises a retaining rod having a favourably discriminating transverse shear region.

10. The container according to claim 9, in which said favourably discriminating transverse shear region is formed by an annular groove in the surface of the retaining rod.

11. The container according to claim 1, wherein the closure element comprises a metal foil element fixed at its outer periphery to the release outlet mouth.

* * * * *